UNITED STATES PATENT OFFICE.

GEORGE EDWARD HEYL, OF LONDON, ENGLAND.

CREOSOTE-OIL SUBSTITUTE AND PROCESS OF MAKING SAME.

1,242,188.  Specification of Letters Patent.  Patented Oct. 9, 1917.

No Drawing.  Application filed February 21, 1917. Serial No. 150,017.

*To all whom it may concern:*

Be it known that I, GEORGE EDWARD HEYL, subject of the King of Great Britain, residing at King's House, Kingsway, London, England, have invented new and useful Improvements in Creosote-Oil Substitutes and Processes of Making Same, of which the following is a specification.

This invention relates to an improved process for obtaining a substitute for creosote oil for impregnating or coating timber and for other purposes.

Creosote obtained from coal tar or directly from coal, such as light creosote or middle oil distilled from coal tar at 170°–230° C., and also to a certain extent heavy creosote or creosote oil distilled from coal tar at 230°–270° C., has after neutralization of the contained tar acids and removal of the bulk of the naphthalene and naphthalene derivatives by refrigeration, been found to afford, after or without redistillation, a valuable fuel liquid for internal combustion engines.

However, by the process of preparing the tar oil for use as a fuel in internal combustion engines, in some cases as much as 50% of the bulk is abstracted as naphthalene and naphthalene derivatives.

These naphthalene and naphthalene derivatives, although available in the usual way as a source of refined naphthalene, are greatly in excess of the demand for such purpose, and it is the object of the present invention to provide a use for the extracted naphthalene and naphthalene derivatives.

A use for the naphthalene and naphthalene derivatives is provided according to the present invention, by dissolving the naphthalene and naphthalene derivatives in mineral oil and employing the solution for impregnating or coating timber, and for other purposes for which ordinary creosote is used.

By this means not only is a use provided for the naphthalene and naphthalene derivatives, but also the deficiency caused by the diversion of the middle oil and creosote oil from use as timber preserving liquids, is more or less made good.

Moreover, in circumstances where the creosote oils are imported into a mineral oil producing country, freight will be saved by the importation of the naphthalene and naphthalene derivatives only, which are to be dissolved in mineral oil in the importing country.

The present invention therefore consists in dissolving naphthalene and naphthalene derivatives in mineral oil and in the so-produced product.

As much as equal quantities of naphthalene and naphthalene derivatives and mineral oil will enter into solution one in the other on heating the oil to 80° C.

On cooling, the oil assumes the consistency of "salty" creosote, and can be used when heated to impregnate or coat timber in the same manner as creosote.

Any mineral oil can be used, such as crude petroleum, unrefined kerosene or the like.

The naphthalene and naphthalene derivatives can be obtained as follows:—

Middle oil obtained from coal tar is for example neutralized and washed by mixing the oil with 10–30% of caustic alkali, caustic soda for instance, in an aqueous solution. After separation from such alkaline solution the oil is washed with 2–5% of sulfuric acid. The oil is then washed with water and decanted off, after which the oil is refrigerated to about or below 0° C. The refrigerated oil is passed through a filter press whereby the naphthalene and naphthalene derivatives are retained in cakes.

These cakes of naphthalene and naphthalene derivatives after abstraction from the filter press, are subsequently dissolved in mineral oil as above described either after transit to a region where mineral oil is abundant or at the place where the naphthalene and naphthalene derivatives are produced, or elsewhere, according to circumstances.

The naphthalene and naphthalene derivatives can also be obtained by allowing the respective tar oil to stand after neutralization, washing and refrigeration until the naphthalene and naphthalene derivatives crystallize out, whereafter the oil can be decanted.

The yield of naphthalene and naphthalene derivatives can be increased by mixing the oil hot or cold with concentrated caustic alkali, in addition to or instead of the treatment of the oil with dilute caustic alkali.

Obviously naphthalene and naphthalene derivatives obtained in the usual manner by the normally occurring separation out of naphthalene from the cooled distillate in the distillation of coal tar, can be employed for carrying out the present invention.

I claim:

1. A process for obtaining a substitute for creosote oil, consisting in dissolving in mineral oil, naphthalene and naphthalene derivatives obtained from coal tar distillates.

2. A process for obtaining a substitute for creosote oil, consisting in dissolving in mineral oil, naphthalene and naphthalene derivatives obtained from the distillate creosote distilled from coal tar between 170°–270° C.

3. A process for obtaining a substitute for creosote oil, consisting in dissolving in mineral oil, naphthalene and naphthalene derivatives obtained from middle oil distilled from coal tar between 170°–230° C.

4. A process for obtaining a substitute for creosote oil, consisting in heating mineral oil and in dissolving in said heated mineral oil, naphthalene and naphthalene derivatives obtained from coal tar distillates.

5. A process for obtaining a substitute for creosote oil, consisting in heating to 80° C. mineral oil and in dissolving in said heated mineral oil an approximately equal quantity of naphthalene and naphthalene derivatives obtained from coal tar distillates.

6. A process for obtaining a substitute for creosote oil, consisting in neutralizing creosote distilled from coal tar between 170°–270° C., refrigerating said neutralized creosote, separating the deposited naphthalene and naphthalene derivatives from said creosote and dissolving said naphthalene and naphthalene derivatives in mineral oil.

7. A process for obtaining a substitute for creosote oil, consisting in neutralizing middle oil distilled from coal tar between 170°–230° C., refrigerating said neutralized middle oil, separating the deposited naphthalene and naphthalene derivatives from said middle oil and dissolving said naphthalene and naphthalene derivatives in mineral oil.

8. A process for obtaining a substitute for creosote oil, consisting in mixing with concentrated caustic alkali, creosote distilled from coal tar between 170°–270° C., refrigerating said creosote, separating the deposited naphthalene and naphthalene derivatives from said creosote and dissolving said naphthalene and naphthalene derivatives in mineral oil.

9. A process for obtaining a substitute for creosote oil, consisting in mixing with concentrated caustic alkali, middle oil distilled from coal tar between 170°–230° C., refrigerating said middle oil, separating the deposited naphthalene and naphthalene derivatives from said middle oil and dissolving said naphthalene and naphthalene derivatives in mineral oil.

10. A substitute for creosote oil, consisting of a solution in mineral oil, of naphthalene and naphthalene derivatives obtained from coal tar distillates.

11. A substitute for creosote oil, consisting of a solution in an approximately equal quantity of mineral oil, of naphthalene and naphthalene derivatives obtained from coal tar distillates.

12. A substitute for creosote oil, consisting of a solution in mineral oil, of naphthalene and naphthalene derivatives obtained from the distillate creosote distilled from coal tar between 170°–270° C.

13. A substitute for creosote oil, consisting of a solution in mineral oil, of naphthalene and naphthalene derivatives obtained from middle oil distilled from coal tar between 170°–230° C.

In testimony whereof I have signed my name to this specification in the presence of two subscribing witnesses.

GEORGE EDWARD HEYL.

Witnesses:
M. MELLOR,
GEO. VAN DYNE.